(12) United States Patent
Rothman

(10) Patent No.: US 7,779,686 B1
(45) Date of Patent: Aug. 24, 2010

(54) VELOCITY MEASURING BALL

(75) Inventor: Jacob Rothman, San Leandro, CA (US)

(73) Assignee: National Broom Company of California, Inc., San Leandro, CA (US)

( * ) Notice: Subject to any disclaimer, the term of this patent is extended or adjusted under 35 U.S.C. 154(b) by 878 days.

(21) Appl. No.: 11/639,196

(22) Filed: Dec. 15, 2006

(51) Int. Cl.
G01P 1/07 (2006.01)
A63B 65/00 (2006.01)

(52) U.S. Cl. .......................... 73/488; 473/415; 473/192

(58) Field of Classification Search .................. 73/488, 73/490–495, 498–499; 473/152–154, 190, 473/198–200, 415, 192; 273/108.31, 108.32, 273/108.33, 317.6, 317.7, 317.8, 317.9

See application file for complete search history.

(56) References Cited

U.S. PATENT DOCUMENTS

| 4,166,976 A | | 9/1979 | Ruhnau et al. | |
|---|---|---|---|---|
| 4,770,527 A | * | 9/1988 | Park | 356/28 |
| 4,775,948 A | | 10/1988 | Dial et al. | |
| 5,020,496 A | * | 6/1991 | Huber et al. | 123/399 |
| 5,526,326 A | * | 6/1996 | Fekete et al. | 368/10 |
| 5,946,643 A | * | 8/1999 | Zakutin | 702/149 |
| 6,079,269 A | * | 6/2000 | Dilz, Jr. | 73/488 |
| 2004/0075846 A1 | * | 4/2004 | Ritterhouse | 356/621 |

* cited by examiner

Primary Examiner—Helen C. Kwok
(74) Attorney, Agent, or Firm—Theodore J. Bielen, Jr.

(57) ABSTRACT

A device for calculating the speed of movement of a ball utilizing a sensing unit having an aperture at the surface of the ball and a receiving unit within the ball that measures reflected signals generated by the sensing unit. A distance measuring feature fixes a value for a particular distance of flight of the ball and a transducer receives a signal indicating the termination of the flight of the ball. A processor calculates the speed of the ball utilizing the absence of a reflected signal through the aperture and the beginning of a stop signal generated by the transducer as the basis for the time span of flight of the ball.

9 Claims, 3 Drawing Sheets

VELOCITY MEASURING BALL

BACKGROUND OF THE INVENTION

The present invention relates to a novel and useful ball having velocity measuring capabilities.

Balls are used in many sporting events and are found in all shapes and sizes. It is often desirable to calculate the speed of a ball being batted, thrown, kicked and the like to determine the level of playing of the particular sports activity in which the ball is being employed. For example, a baseball hurled at 100 miles per hour indicates that a pitcher delivering such ball is capable of participating in big league activities. Also, novices of all ages are generally interested in determining the speed of a ball during its flight of travel just for the sake of curiosity and delight.

In the past, stop watches and visual observations have been used to calculate the speed of a ball's travel. In addition, radar has been employed to make the same determination with higher accuracy and in a prompt manner.

Self contained measuring apparatuses for balls have also been devised. For example, U.S. Pat. No. 4,166,976 discloses a circuit for the digital measurement for the speed of a moving object. The object generally moves in a rotational manner such that cycle duration values are measured each relative to certain fixed speed values.

U.S. Pat. No. 4,775,948 describes a baseball having inherent speed measuring capabilities. The baseball is constructed with a chip that determines stopping of ball movement via a piezoelectric switch, which is used in conjunction with a manually operated start switch. The distance applied to the ball is preset through a counter which also determines the speed of the ball during its flight.

A baseball having speed measuring ability which does not require a manual actuation of a start switch and is easily adjusted for varying distance would be a notable advance in the field of sporting equipment.

BRIEF SUMMARY OF THE INVENTION

In accordance with the present invention, a novel and useful device for calculating the speed of movement of a ball is herein provided.

The device of the present invention is utilized with a ball and includes a sensing unit having an aperture at the surface of the ball. A signal generating element, generally located within the ball, sends an outward signal through the aperture of the ball. A signal receiving unit, located within the ball, acquires a reflection of such outward signal through the aperture. The distance of the flight of the ball is also predetermined by means which fixes a value for a particular distance of flight the ball travels.

A transducer is also employed in the present invention for receiving a sound signal indicating the termination of the flight of the ball and transforms the same into a stop signal. The termination of the flight of the ball may include the noise generated by the ball hitting the hand of a catcher, or other object terminating the flight of the ball.

A microcontroller or microprocessor is located within the ball and recognizes the time of flight of the ball. Such time of flight of the ball is based on the time span between the initial absence of the reflected outward signal at the aperture of the ball and the beginning of the stop signal generated by the transducer. The microcontroller or processor calculates the speed of the ball during the flight of the ball by employing the value for the particular distance of flight of the ball and the time of flight of the ball consisting of the time span between the instant of the absence of the reflected outward signal through the aperture and the initiation of the stop signal by the transducer.

In certain cases, the sensing unit may include a photoelectric sensor which is located within the ball adjacent the aperture through the ball. Further, the transducer may comprise a piezoelectric element which detects sound waves generated by any activity which concerns the cessation of the flight of the ball.

In addition, the present invention may include a display indicating speed of the ball acheived during the flight of the ball, as well as particular distances set into the distance predetermining means prior to the flight of the ball.

A computer program may be entered into the microprocessor within the ball to accommodate the above identified functions which eventually calculates the speed of the movement of the ball.

It may be apparent that a novel and useful device for calculating the speed of movement of a ball has been herein above described.

It is therefore an object of the present invention to provide a device for calculating the speed of movement of a ball which is automatic and is easily seen by the user of the device of the present invention.

Another object of the present invention is to provide a device for calculating the speed of movement of a ball which allows the user to preset a particular distance and automatically performs speed calculations dependent on the stopping of the flight of the ball.

Yet another object of the present invention is to provide a device for calculating the speed of movement of a ball in which initiation of the time of flight determination automatically takes place upon release of the ball by the thrower of the ball.

A further object of the present invention it to provide a device for calculating the speed of movement of a ball which is accurate and reliable and is easily accomplished in repeated fashion for multiple fights of the ball.

Yet another object of the present invention is to provide a device for calculating the speed of movement of a ball which includes components that do not interfere with the flight of the ball and are generally found within the ball itself.

The invention possesses other objects and advantages especially as concerns particular characteristics and features thereof which will become apparent as the specification continues.

For a better understanding of the invention reference is made to the following detailed description of the preferred embodiments of the invention which should be taken in conjunction with the above described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior described drawings.

Figure 1:
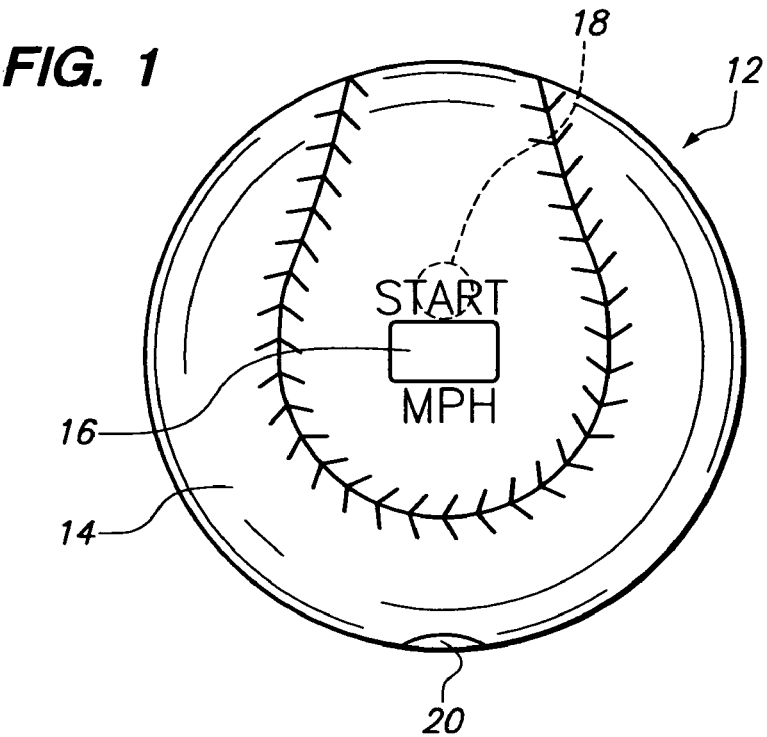
FIG. 1 is a front elevational view of a ball embodying the device of the present invention showing the display and start actuator, (in phantom).
Figure 2:
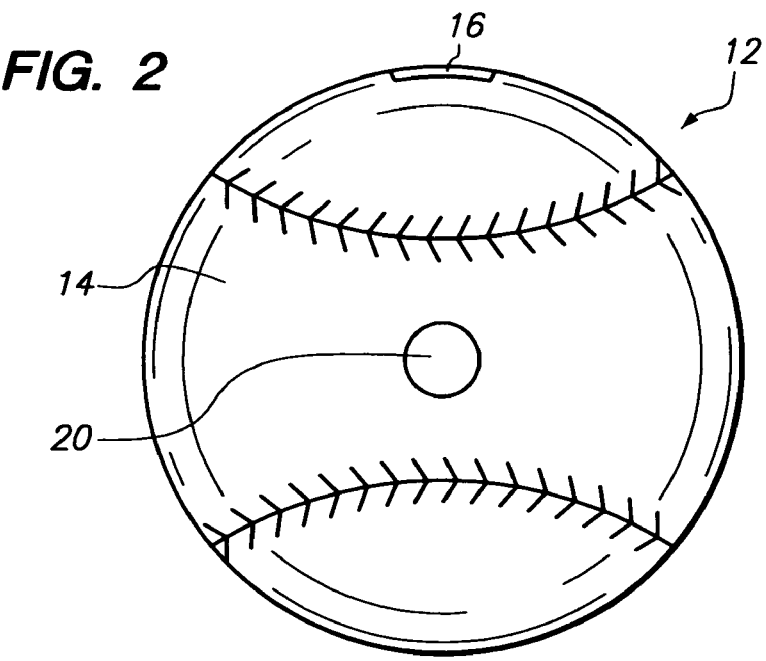
FIG. 2 is a bottom plan view of the ball of the present invention showing an aperture in the ball employed with the sensing unit.
Figure 3:
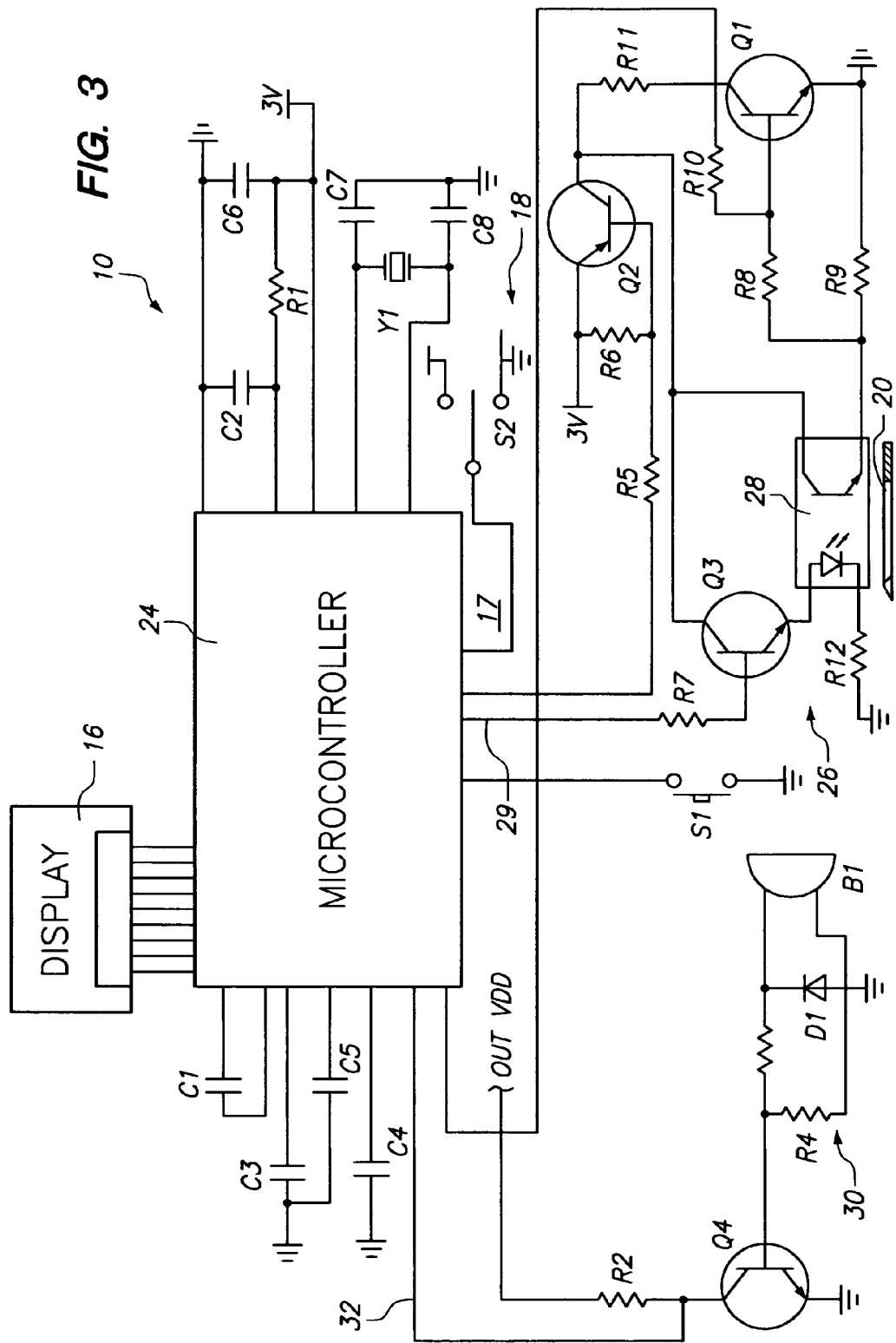
FIG. 3 is an electrical schematic generally indicating the operation of the device of the present invention.

The invention as a whole is generally shown by reference character 10, FIG. 3. With reference to FIGS. 1 and 2, it may be observed that the device 10 of the present invention is used in conjunction with an exemplary baseball 12 having an outer surface 14. Device 10 includes a display 16 which, eventually, shows the speed attained by ball 12 through a flight. A switch actuator 18 is depicted in phantom on FIG. 2 and lies below the outer surface 14 of ball 12. However, the application of pressure to outer surface 14 immediately above switch actuator 18 will operate the same. Approximately 90° from display 16 on surface 14 is an aperture 20 which extends through surface 14 of ball 12 and is protected by a transparent window 22. Aperture 22 is employed in the present invention with a sensing unit that lies immediately below aperture 20 and will be described as the application proceeds.

Turning now to FIG. 3, it may be observed that an electronic circuitry is found and is mounted on conventional elements within ball 12, depicted schematically by a phantom rectangle on FIG. 2. Circuitry 10 includes a microcontroller 24 which includes numerous inputs. S-1 is employed to preset the system of measurement shown in display 16, i.e. miles per hour, kilometers per hour, and the like. Generally, S-1 is set for the metric or American system of measurement prior to use of ball 12 by the person tossing the same. Such distance is eventually shown in display 16. Distance determining means 17 is actuated by switch S-2 and fixes a particular value for the anticipated distance of flight of ball 12. That is to say, the switch S-2 having actuator 18, is pressed and held until display 16 shows the desired distance, i.e. 60', 70' and the like. Once actuator 18 is released S-2 sends that particular option signal to microcontroller 24 which stores the same as the anticipated distance ball 12 will travel. Capacitors C-1, C-2, C-3, C-4, C-5, and C-6 as well as resistor R-1 tune microcontroller in its operation. Clock input Y-1, in conjunction with capacitor C-7 and C-8, provides the timing basis to microcontroller 24.

Sensing unit 26 consists of transistor Q-3 and photoelectric sensor 28. Photoelectric sensor 28 lies opposite aperture 20 on the surface of ball 12. An optical signal is generated by photoelectric sensor 28 and directed through aperture 20. Reflected signals are captured by photoelectric sensor 28 and sent to amplifying circuit comprising transistor Q-1, and resistors R-8, R-9, R-10, and R-11. Said signal is imputed by microcontroller 24. Should a reflected signal not be detected by photoelectric sensor 28, Q-3 will input a beginning of flight signal 29 via resistor R-7 to microcontroller 24. In essence, the covering of aperture 20 by a user's hand or portion thereof would cause a reflected signal, while the absence that such reflected signal to photoelectric sensor 28 will indicate the movement of the user's hand from aperture 20. It should be realized that this arrangement serves as the flagging of the beginning of the flight of the ball from the user's hand.

Device 10 also includes a transducer 30 which generates a stop signal when the ball having completing its flight hits an object such as the hand of a user or another solid surface. Such transducer includes piezoelectric member B-1, diode D-1, resistor R-4, and a pull down resistor R-2. Again, such stop signal 32 is fed to microcontroller 24. It should be noted that the device 10 depicted electronically in FIG. 3 is powered by a source of DC voltage, typically 3 volts noted on the schematic adjacent timing device Y-1.

A compact disc with a computer software program used to operate microcontroller 28 is included with the present application and permits the performing of the functions described herein.

Figure 4:
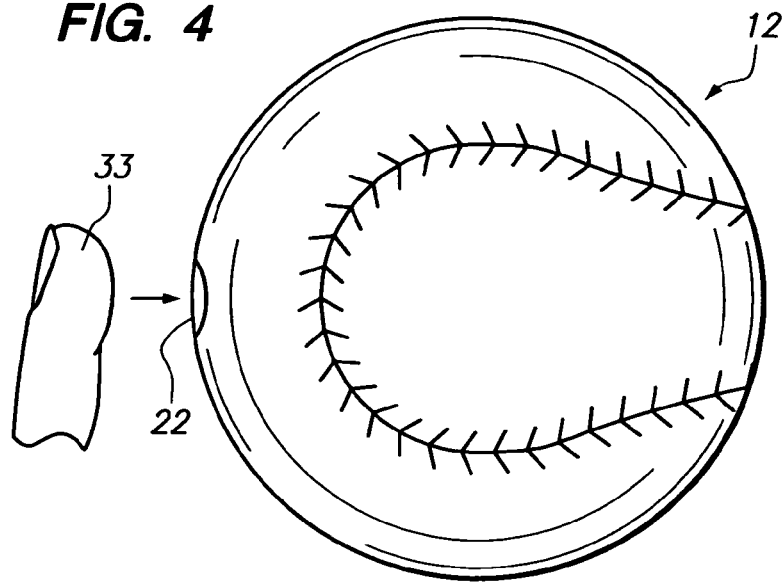
FIG. 4 is a side elevational view of a ball embodying the device of the present invention used in conjunction with a finger of the user.
Figure 5:
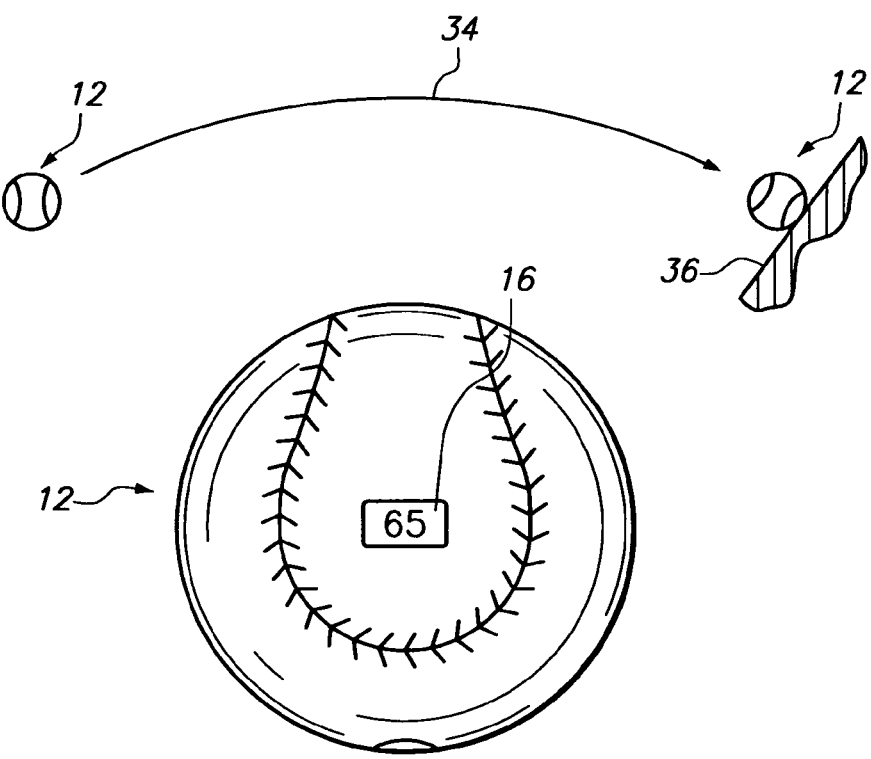
FIG. 5 is a conceptual view demonstrating the use of the present invention and a typical display of the speed achieved by the ball determined by the components of device of the present invention.

FIG. 4 indicates the initiation of the initiation of the calculation of the speed of ball 12 in a flight. Actuator 18 of S-2, FIG. 1, is pressed through the outer surface 14 of ball 12. Such action turns on the device, and, when such pressure is maintained, will indicate options for the particular distance ball 12 is to travel. Such distance indication is shown in display 16 and is fixed by release of the user's hand of finger from actuator 18. The distance of flight value is stored in microcontroller 24. The user then covers aperture 22 with a finger, such as thumb depicted on FIG. 4. The covering of aperture 22 creates reflected signals generated by photoelectric sensor 28 and sent through the amplifying circuit, including transistor Q-1, to microcontroller 24. As soon as thumb 33 is released from aperture 22, Q-3 sends a start signal 29 to microcontroller 24 to begin the timing of the flight of the ball. Since such event usually occurs when a person tosses ball 12, such a signal is automatically generated without further manipulation of ball 12. FIG. 5 indicates the movement of ball 12 through a flight path 34. A surface 36 shows the stopping of flight of ball 12. Surface 36 may be a hand of a user, the mitt on the hand of the user, or another object such as a pad or wall. When this occurs, a sound signal is generated and sent to piezoelectric element B-1 and a stop signal 32 is forwarded to microcontroller 24. The time span between the start signal 29 from sensing unit 28 an stop signal 32 from piezoelectric element B-1 is compared to the distance presented by switch S-2. Microcontroller 24 then calculates the speed of ball 12 which occurred during its flight 34. As depicted in FIG. 5, such speed as shown as 65 miles per hour in display window 16. The calculation of the speed of flight of ball 12 may be repeated following the generation of stop signal 32 by repeating the process above described.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A device for calculating the speed of a movement of a ball comprising
    a. a sensing unit including an aperture at a surface of the ball, a signal generating element sending an outward signal through said aperture and a signal receiving unit acquiring a reflected outward signal, through said aperture;
    b. distance predetermining means for fixing a value for a particular distance of flight the ball will travel;
    c. A transducer for receiving a sound signal indicating a termination of the flight of the ball into a stop signal;
    d. a microprocessor within the ball for recognizing a time of flight of the ball as a time span between the absence of said reflected outward signal through said aperture and the beginning of said stop signal, and calculating a speed of the ball during flight of the ball by employing said value for said particular distance of flight of the ball and said time of flight of the ball, said reflected outward signal through said aperture, and said stop signal.

2. The device of claim 1 in which said sensing unit includes a photo electric sensor.

3. The device of claim 1 in which said transducer comprises piezoelectric element.

4. The device of claim 1 in which said distance predetermining means includes an actuator.

5. The device of claim 1 which further comprises a display indicating the speed of the ball during the flight of the ball.

6. The device of claim 5 in which said distance predetermining means is activated of said display.

7. The device of claim 5 in which said sensing unit includes a photo electric sensor.

8. The device of claim 5 in which said transducer comprises piezoelectric element.

9. The device of claim 5 in which said distance predetermining means includes an actuator.

* * * * *